United States Patent Office 3,291,847
Patented Dec. 13, 1966

3,291,847
CATALYTIC ALKYLATION OF ALKYL-SUBSTITUTED AROMATICS WITH MONOOLEFINS
Paul F. Warner, Phillips, Tex., assignor to Phillips Petroleum Company, a corporation of Delaware
No Drawing. Filed Jan. 2, 1964, Ser. No. 335,354
6 Claims. (Cl. 260—668)

This invention relates to an improved process for the catalytic alkylation of alkyl-substituted aromatics with monoolefins. In another aspect, it relates to an improved process for the preparation of isobutylbenzene by the potassium-catalyzed alkylation of toluene with propylene.

The alkylation of alkyl-substituted aromatics with monoolefins has been the subject of a number of investigations and patents. Although different catalyst systems have been proposed for this process, an alkali metal catalyst system has been of particular interest in the art since it results in alkylation of the alkyl side chain. Disadvantages encountered in the use of such alkali metal catalyst system, however, are the low production rate, conversion, selectivity and yield of desired alkylated product. It has recently been discovered that these disadvantages can be overcome to a significant extent by carrying out the alkylation in the presence of a catalyst comprising a major amount of sodium and/or potassium and a minor amount of graphite.

Accordingly, an object of this invention is to provide an improved process for the catalytic alkylation of alkyl-substituted aromatics with monoolefins. Another object is to provide an improved process for the preparation of isobutylbenzene by alkylation of toluene with propylene, using a novel catalyst system. Another object of this invention is to provide a novel composition, suitable as a catalyst in the alkylation of alkyl-substituted aromatics with monoolefins. Another object is to improve the production rate, conversion, selectivity and yield of desired alkylated product in the catalytic alkylation of an alkyl-substituted aromatic with a monoolefin. Other objects and advantages of this invention will become apparent to those skilled in the art from the following description and accompanying claims.

Briefly, the present invention comprises a process wherein an alkyl-substituted aromatic is alkylated with a monoolefin in the presence of a catalyst comprising (1) a major amount of potassium, sodium, or sodium-potassium alloy (NaK) and (2) a minor amount of graphite, supported on soda ash, $Na_2CO_3$. I have discovered that this support, soda ash, materially increases the reaction rate above that obtained when the alkylation is carried out with the unsupported alkali metal-graphite system, or, for that matter, the unsupported alkali metal per se. Further, when the alkylation is carried out with the catalyst system of this invention, viz., alkali metal-graphite supported on soda ash, the reactor is not fouled with a brown tarry polymer which is produced when the reaction is carried out with the unsupported catalyst system. The improved process of this invention is exemplified by the side chain alkylation of toluene with propylene in the presence of a catalyst consisting of a major amount of potassium or sodium-potassium alloy and a minor amount of graphite, supported on soda ash, to prepare isobutylene at a fast reaction rate with a high yield, conversion, and selectivity. I prefer to use, as the alkali metal catalyst component, either potassium or sodium-potassium alloy, since sodium will require higher alkylation reaction temperatures and/or pressures and thus add to the cost of the process.

The potassium or sodium, employed as a catalyst component in this invention, can be mixed in its particulate, powdered or finely divided form with the graphite and soda ash and the mixture heated above the melting point of the metal to aid dispersion. I prefer to use the alkali metal in a colloidal or near colloidal form, e.g., 0.5 to 1000 millimicrons, in which form it will have a high surface area which will promote a higher reaction rate. The sodium-potassium alloys which are preferably used as the alkali metal catalyst component are liquid at room temperature and have 40 to 90 weight percent potassium, with 77 weight percent potassium forming a eutectic. These alloys can be mixed with the support and graphite and the mixture heated if desired to aid dispersion and form a homogenous mixture. Graphite is, of course, an allotropic form of carbon having a hexagonal arrangement of crystals in parallel displaced sheets, and as such differs from other forms of carbon, such as activated carbon or charcoal. The soda ash, used as a support for the catalyst, can also be used in its particulate or finely divided form, a suitable size being 20 to 100 mesh U.S. standard sieve. Although the supported catalyst can be preformed as described, I prefer to charge the catalyst components and support separated to the alkylation reactor and form the supported catalyst in situ.

Generally, the alkyl-substituted aromatics which are alkylated in this invention will have an aromatic nucleus, selected from the group consisting of benzene and naphthalene, with at least one alkyl hydrocarbon side chain having at least one active hydrogen atom bonded to the alpha carbon atom of the alkyl side chain. The alkyl side chain can comprise only one carbon atom, as in the case of the methyl group in toluene, or the side chain can comprise a number of carbon atoms in straight or branched chain relation, such as in the case of the normal butyl radical in normal butylbenzene. The length of the alkyl side chain and the number of alkyl side chains can vary, but generally the total carbon atoms in the sum of the side chains will be in the range of 1 to 20 and the number of such side chains will be in the range of 1 to 4. Representative alkyl-substituted aromatics which can be alkylated according to this invention include toluene, ethylbenzene, isobutylbenzene, n-decylbenzene, 1,2,3,4-tetra-n-pentylbenzene, n-eicosylbenzene, 1-ethyl-4-n-octadecylnaphthalene, m-xylene, o-xylene, p-xylene, mesitylene, methyl naphthalene, 1,2,4,5-tetramethylbenzene, 1,4-di-n-pentylnaphthalene, and the like, including mixtures thereof. I prefer to alkylate alkylbenzenes, such as toluenes. The aromatic nucleus of the alkyl-substituted aromatic can have other substituents, such as chloro, methoxy, ethoxy, nitro, and the like, but I prefer that the alkyl-substituted aromatic be strictly a hydrocarbon with the alkyl side chains being the only nuclear substituents.

The monoolefins which are employed as alkylating agents according to this invention are preferably acyclic monoolefins with 2 to 10 carbon atoms. Representative monoolefins which can be so employed to alkylate any one of the aforementioned alkyl-substituted aromatics include ethylene, propylene, 1-butene, 2-butene, isobutylene, 1-pentene, 2-pentene, 1-hexene, 2-hexene, 3-hexene, 1-heptene, 2-heptene, 2-octene, 4-nonene, 2-decene, 3-methyl-1-butene, 2-methyl-2-butene, 4-methyl-1-pentene, and the like, including mixtures thereof. I prefer to use the lower monoolefins, such as ethylene and propylene, as the alkylating agent.

The operating variables employed in the alkylation process of this invention can vary widely and will be dependent upon the particular alkyl-substituted aromatic and monoolefinic reactants used and their ratios. The process can be operated either batchwise or in a continuous fashion, with the reactants brought into mutual contact in any order of addition. The reactants can be dried and preheated if desired and introduced separately or as a mixture into the reaction zone provided with suitable agitation means. After the reaction is complete, the reaction mixture can be cooled, gases and vapors vented therefrom, and the reaction mixture filtered to remove catalyst and support. The liquid reaction product can be fractionally distilled or otherwise separated to obtain the desired alkylated product. Unreacted aromatic and/or monoolefin can be recovered and recycled to the alkylation reaction zone if desired. The catalyst and any metalated compound can be inactivated or decomposed, if desired, by adding a polar compound, for example, an alcohol such as methanol or isopropanol, to the reaction residue.

Generally, the reaction conditions will comprise those of elevated temperatures and superatmospheric pressures. A suitable alkylation temperature will usually be in the range of 100 to 300° C., preferably 150 to 250° C. The pressure used is preferably that sufficient to maintain the alkyl-substituted aromatic in liquid phase, such pressure being in the range of about 250 to 600 p.s.i.g., preferably 400 to 500 p.s.i.g., though higher pressures, e.g., up to 800 p.s.i.g., may be employed if desired, depending upon the reactants chosen and how they are charged and the desired reaction temperature. The reaction period can also vary widely and will be that sufficient to produce a desired yield of alkylated product, but generally the reaction period will range from 1 hour to as much as 50 hours, or even longer, depending upon whether the reaction is carried out batchwise or in a continuous fashion, and upon other factors such as the relative amounts of reactants used. Because of the high production rates obtained with the use of the novel catalyst system, the reaction period will be shorter than that found necessary heretofore to obtain high yields and high conversions.

The molar ratio of alkyl-substituted aromatic to monoolefin can widely vary, but usually will be in the range between 0.2 to 2, and can be generally in the range of 0.5 to 20. An excess over the stoichiometric amount of the monoolefin can be used, but in most cases it will be preferable to operate with a stoichiometric deficiency of monoolefin. The amount of catalyst used can also vary and stated functionally will be an amount sufficient to catalyze the desired side chain alkylation. The amount of alkali metal catalyst component used will generally be a major amount (i.e., greater than 50 weight percent) of the catalyst and usually will be from 0.01 to 1.0 gram atom per mole of the charged alkyl-substituted aromatic reactant. Generally, the amount of graphite used, in combination with the alkali metal, will be a minor amount (i.e., less than 50 weight percent) of the catalyst, this amount being usually from 0.5 to 20 grams per gram atom of alkali metal present in the alkylation zone, preferably from 1 to 10 grams per gram atom of alkali metal present. The amount of catalyst supported on the soda ash can vary, e.g., from 0.5 to 20 weight percent of the mixture, preferably about 1 to 8 weight percent.

The process of this invention can be carried out with any suitable equipment, such as a glass-lined or steel autoclave or tubular reactor, with provision made for stirring the reactants. In commercial operation, it may be desirable to carry out the alkylation in a continuous manner, for example, by passing the reactants over or through a fixed bed of the supported catalyst, with continuous or incremental addition of small amounts of the alkali metal catalyst components to the top of the bed with the feed to maintain catalyst activity and high production rate. In charging the reactants and in carrying out the reaction, care should be exercised to exclude air or oxygen-containing gas and moisture, and this can be accomplished by purging the reactor with dry nitrogen or other dry inert gas prior to charging it with the reactants and catalyst and by pressuring the reactants and catalyst into the reaction vessel with such gas.

The alkyl-substituted aromatic, when used in excess with respect to the monoolefin, functions also as a diluent. However, extraneous diluents such as liquid paraffins, cycloparaffins and aromatics can be employed using, for example, 10 to 200 volume percent of diluent, based on the volume of the alkyl-substituted aromatic. The extraneous diluent used should be inert under the alkylation conditions employed and boil outside the range of the alkyl-substituted aromatic or the desired alkylation products, so that it may be readily separated by the fractional distillation of the alkylation reaction mixture. Suitable diluents which may be used include n-pentane, n-hexane, isooctane, cyclohexane, naphthalene, decahydronaphthalene, white oils, etc.

Further objects and advantages of this invention are illustrated in the following examples, but it should be understood that the various materials employed, conditions of operation, and other details recited in these examples should not be construed to unduly limit this invention.

*Example 1*

Toluene was alkylated with propylene in a number of batch runs using different catalyst systems. In each of these runs, toluene and preformed catalyst or catalysts components and support were added under a nitrogen blanket to a 2-liter autoclave equipped with a motor-driven propeller type stirrer with a normal operating speed of 600 r.p.m. The reactor was then closed, heated to the operating temperature, usually 350° F., as rapidly as possible (½ to 1 hr.). The nitrogen gas was vented to the atmosphere, and propylene under nitrogen pressure was fed to the reactor as needed to keep the reactor at 450 p.s.i.g. pressure. Samples of the reaction mixture were periodically withdrawn and analyzed by gas-liquid chromatography for purposes of determining the composition of the reaction mixture and the conversion of toluene to the desired isobutyl-benzene product. The catalyst systems evaluated in these runs were unsupported potassium, unsupported potassium-graphite, supported potassium, supported potassium-graphite, and supported sodium-potassium alloy-graphite, the last two catalyst systems being those of this invention. The supported catalysts of Run 4 was prepared in situ by charging the potassium, graphite, soda ash and toluene to the reactor, heating the latter to 350° F., and then feeding the propylene to the reactor on pressure demand. In the case of the supported catalysts of Runs 5–8, the catalysts were preformed by mixing the support and catalyst components while heating the same above the melting point of the alkali metal catalyst component. The reactants, conditions of reaction and results are summarized and set forth in Table I.

TABLE I

| | Run | | | | | | | |
|---|---|---|---|---|---|---|---|---|
| | 1 | 2 | 3 | 4[1] | 5 | 6 | 7 | 8 |
| Catalyst: | | | | | | | | |
| Alkali metal used | K | K | K | K | K | K | NaK | NaK. |
| Form of alkali metal | Chunk | Chunk | Chunk | Chunk | Hi. surf.[2] | Hi. surf. | Hi. surf. | Hi. surf. |
| Amt. of alkali metal, g | 7.5 | 7.5 | 7.5 | 7.5 | 7.5 | 7.5 | 8.75[3] | 10.0[4]. |
| Amt. of graphite, g | 0 | 1.1 | 1.1 | 1.1 | 0 | 1.1 | 0.62 | 1.25. |
| Support ($Na_2CO_3$), g | 0 | 0 | 0 | 150 | 75 | 130 | 75 | 150. |
| Toluene, g | 762 | 762 | 762 | 762 | 762 | 762 | 762 | 762. |
| Propylene, g | | 410 | 430 | 570 | 270 | 450 | 530 | 560. |
| Temperature, °F | 350 | 350 | 330 | 350 | 350 | 350 | 350 | 350. |
| Pressure, p.s.i. g | 450 | 450 | 450 | 450 | 450 | 450 | 450 | 450- |
| Conversion (percent) of toluene after: | | | | | | | | |
| 1 hr. reaction | 1.0 | 2.1 | 5.0[5] | 2.0 | 2.1 | 18.6[5] | 13.5 | 16.0. |
| 3 hr. reaction | 5.7 | 16.0 | 21.2 | 34.3 | 5.2 | 51.5[5] | 39.6 | 47.7. |
| 5 hr. reaction | 10.4 | 30.1 | 34.1[5] | 59.7 | 7.1 | 66.7[5] | 61.1 | 68.4. |
| 7 hr. reaction | | 38.0 | 41.6 | 71.3 | | 74.3[5] | 71.9 | 74.6. |
| 9 hr. reaction | | 44.0 | 46.9 | | | 78.4[5] | | |
| Products from toluene, mole percent:[6] | | | | | | | | |
| Isobutylbenzene | 87.0 | 84.2 | 86.7 | 86.5 | 85.1 | 87.0 | 86.6 | 86.4. |
| n-Butylbenzene | 9.9 | 8.4 | 5.5 | 9.8 | 12.3 | 8.8 | 10.1 | 9.8. |
| 2-methylindane | 2.1 | 3.7 | 4.5 | 0.6 | 1.1 | 0.8 | 0.6 | 0.6. |
| Heavies | 0.9 | 3.7 | 3.3 | 3.1 | 1.5 | 3.4 | 2.7 | 3.2. |
| Hexanes in effluent, weight percent of isobutylbenzene | 4.9 | 14.0 | 7.4 | 15.7 | 10.8 | 11.0 | 15.3 | 15.6. |

[1] In this run the yield of isobutylbenzene (IBB) from the toluene charged was 61.8 mole percent, the yield of IBB from the propylene charged was 39.1 mole percent, the amt. of IBB in grams produced per gram of potassium catalyst was 91, the ultimate yield of IBB from toluene was 86.6 mole percent, and the ultimate yield of IBB from propylene was 58.5%.
[2] "hi. surf." means alkali metal was colloidal and had a high surface area.
[3] The 8.75 grams of NaK consisted of 7.5 grams of K and 1.25 grams of Na.
[4] The 10.0 grams of NaK consisted of 7.5 grams of K and 2.5 grams of Na.
[5] This conversion is for the indicated hour plus 0.2 hr.
[6] These mole percent values are given at end of 9 hr. for all runs except Run 5, in which the values are given at the end of 5 hr.

Examination of Runs 1–4 of Table I shows that although the unsupported potassium-graphite catalyst of Runs 2 and 3 gave significantly higher reaction rates than the unsupported potassium catalyst of Run 1, even greater reaction rates (almost double) were obtained in Run 4 with the supported potassium-graphite catalyst of this invention. Further, in Runs 2 and 3 the reactor was heavily fouled with a brown tarry polymer (which precipitated over the wall of the reactor and on its cooling coil), whereas no such reactor fouling was evidenced in Run 4.

In Run 5 the supported high surface potassium catalyst (without graphite), like the unsupported chunk potassium catalyst of Run 1, did not give a high reaction rate. However, in Run 6, with the supported high surface potassium-graphite catalyst of this invention, not only was a high reaction rate obtained but also it was obtained initially, i.e., without an induction period.

Examination of Runs 7–8 shows that the supported high surface sodium-potassium alloy-graphite catalyst of this invention was about effective as the supported high surface potassium-graphite catalyst of Run 6.

These data of Table I show quite conclusively that significant improvement in the alkylation of toluene with propylene to produce isobutylbenzene results when the potassium-graphite or sodium-potassium alloy-graphite catalyst is supported on soda ash, such support materially increasing the reaction rate and causing the reaction to proceed without reactor fouling. Such improvement is obtained with the supported catalyst of this invention being either preformed or formed in situ.

*Example II*

Toluene was alkylated with propylene in a batch run using the supported catalyst system of this invention. The run was carried out in a batch manner using the autoclave of Example I. Toluene and propylene was charged to the reactor at room temperature along with the supported catalyst and the reaction mixture was heated to the desired temperature, 350° F., and the run was carried out at autogenous pressure. Samples of the reaction mixture were periodically withdrawn and analyzed by gas-liquid chromatography to determine the composition of the reaction mixture and the conversion of the reactants. At the end of the batch run, the reactor was cooled to room temperature and opened and the catalyst deactivated by quenching with an alcohol. The reactants used in this run, the conditions of reaction, and the results obtained are summarized and set forth in Table II, such results again demonstrating the utility of this invention.

TABLE II

| Catalyst: | |
|---|---|
| Amt. of high surface potassium, g | 6.0 |
| Amt. of graphite | 0.9 |
| Amt. of support, $Na_2CO_3$, g | 80 |
| Toluene, g | 610 |
| Propylene, g | 308 |

| Run data, hr. at 350° F | 0[1] | 0.5 | 1 | 1.5 | 2 | 3 | 4 | 5.5 |
|---|---|---|---|---|---|---|---|---|
| Reactor pressure, p.s.i.g | 755 | 710 | 610 | 510 | 415 | 280 | 210 | 170 |
| Reactor composition, wt. percent: | | | | | | | | |
| Propylene | 33.2 | 30.4 | 25.4 | 21.7 | 15.2 | 10.4 | 7.3 | 6.0 |
| Hexenes | 0.1 | 0.9 | 2.8 | 2.1 | 5.8 | 7.2 | 8.2 | 7.6 |
| Toluene | 66.0 | 61.5 | 54.8 | 45.4 | 39.5 | 32.4 | 28.1 | 24.3 |
| Isobutylbenzene | 0.6 | 6.3 | 14.5 | 26.4 | 33.8 | 42.8 | 48.4 | 53.4 |
| n-Butylbenzene | 0.1 | 0.8 | 2.2 | 3.7 | 4.8 | 5.5 | 6.1 | 6.0 |
| 2-methylindane | | 0.1 | 0.2 | 0.3 | 0.3 | 0.3 | 0.3 | 0.3 |
| Heavies | | | 0.1 | 0.4 | 0.6 | 1.4 | 1.6 | 2.4 |
| Toluene conversion, mole percent | 0.7 | 7.5 | 17.4 | 31.7 | 40.7 | 51.1 | 57.7 | 63.4 |
| Propylene conversion, mole percent | 1.0 | 9.5 | 24.4 | 35.4 | 54.8 | 69.1 | 78.2 | 87.2 |

Products from toluene at end of run, mole percent:
Isobutylbenzene _____ 87.1
n-Butylbenzene _____ 9.7
2-methylindane _____ 0.5
Heavies _____ 2.7

[1] 35 min. required to heat reactants to 350° F.

Various modifications and alterations of this invention will become apparent to those skilled in the art from the foregoing disclosure and example, and it should be understood that this invention is not to be limited unduly to the preferred embodiments set forth herein.

I claim:

1. A process which comprises contacting an alkyl-substituted aromatic with a monoolefin and with a catalyst supported on soda ash, said catalyst comprising (1) a major amount of an alkali metal selected from the group consisting of potassium, sodium and sodium-potassium alloy and (2) a minor amount of graphite, and recovering the resulting alkylated product.

2. A process which comprises contacting an alkyl-substituted aromatic having a hydrogen-bearing carbon atom alpha to a nuclear double bond with a monoolefin having 2 to 10 carbon atoms per molecule and a catalyst supported on soda ash, said catalyst comprising (1) a major amount of an alkali metal selected from the group consisting of sodium, potassium and sodium-potassium alloy, and (2) a minor amount of graphite, and recovering the resulting alkylated product.

3. The process according to claim 2, wherein said alkali metal is potassium.

4. The process according to claim 2, wherein said alkali metal is sodium-potassium alloy.

5. A process which comprises contacting toluene with propylene and with catalytic amounts of a catalyst supported on soda ash, said catalyst comprising (1) a major amount of potassium and (2) a minor amount of graphite, and recovering isobutylbenzene from the resulting alkylation product.

6. A process which comprises contacting toluene with propylene and with catalytic amounts of a catalyst supported on soda ash, said catalyst comprising (1) a major amount of sodium-potassium and (2) a minor amount of graphite, and recovering isobutylbenzene from the resulting alkylation product.

References Cited by the Examiner

UNITED STATES PATENTS

| | | | |
|---|---|---|---|
| 2,995,610 | 8/1961 | Schapp | 260—668 |
| 3,084,206 | 4/1963 | Yeo et al. | 260—683.15 |
| 3,207,812 | 9/1965 | Hambling et al. | 260—683.15 |
| 3,213,155 | 10/1965 | Schriesheim et al. 260—683.15 X | |

DELBERT E. GANTZ, *Primary Examiner.*

C. R. DAVIS, *Assistant Examiner.*